US006269480B1

(12) United States Patent
Curtis

(10) Patent No.: US 6,269,480 B1
(45) Date of Patent: Jul. 31, 2001

(54) CROSS PLATFORM INSTALLER-WITH THE ABILITY TO CREATE PLATFORM INDEPENDENT VARIABLES OF SPECIFIC OPERATING SYSTEM VARIABLES FROM A SCRIPTING LANGUAGE

(75) Inventor: Bryce Allen Curtis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,344

(22) Filed: Mar. 29, 1999

(51) Int. Cl.[7] ........................................................ G06F 9/44
(52) U.S. Cl. .................................................................. 717/11
(58) Field of Search .................................................. 717/11

(56) References Cited

U.S. PATENT DOCUMENTS

| 5,428,782 | * | 6/1995 | White | 709/101 |
|---|---|---|---|---|
| 5,920,867 | * | 7/1999 | Huben et al. | 707/101 |
| 5,966,540 | * | 10/1999 | Lister et al. | 395/712 |
| 6,006,035 | * | 12/1999 | Nabahi | 395/712 |
| 6,144,960 | * | 11/2000 | Okada et al. | |

OTHER PUBLICATIONS

Setup Factory 4.0, "User's Guide", Mar. 1998, Winnipeg Canada, IndigoRose software Design Corp., pp. 1–84.

Emedialive: Emedia New Products, EMedia Professional, Feb. 1998. http://www.emedialive.com/EM1998/products2.html.

* cited by examiner

Primary Examiner—Mark Powell
Assistant Examiner—Todd Ingberg
(74) Attorney, Agent, or Firm—Marilyn Smith Dawkins

(57) ABSTRACT

A system, method, and program enables a platform independent way for specifying a property, or function, of a program. Values of properties that are specific to a given operating system are treated as a variable in a program which enables it to run on multiple operating systems. This enables the program to be developed and run on different operating systems. The program reads in the properties and the values, or variables, from a script file into property objects. As such, variables that have meaning to a system can be put into the property object as the value for that property. To use the property by the program, the program sends a get call to the property object to get the value or to provide substitution of a platform specific value for the variable. Accessible to the program is a plurality of operating system specific code segments which define an actual value for the variable for the specific operating systems. Once the substitution is made, the program uses the actual substituted value for the process the program is carrying out. At the end of the program's process, the program saves the properties by parsing out the operating system specific value and inserting the variable back in. The program is then capable of being run on a different operating system. This provides a platform independent way for an install program to specify and use directories or other install properties; or for other programs to specify and use properties in general; i.e., by creating platform independent variables for properties.

20 Claims, 2 Drawing Sheets

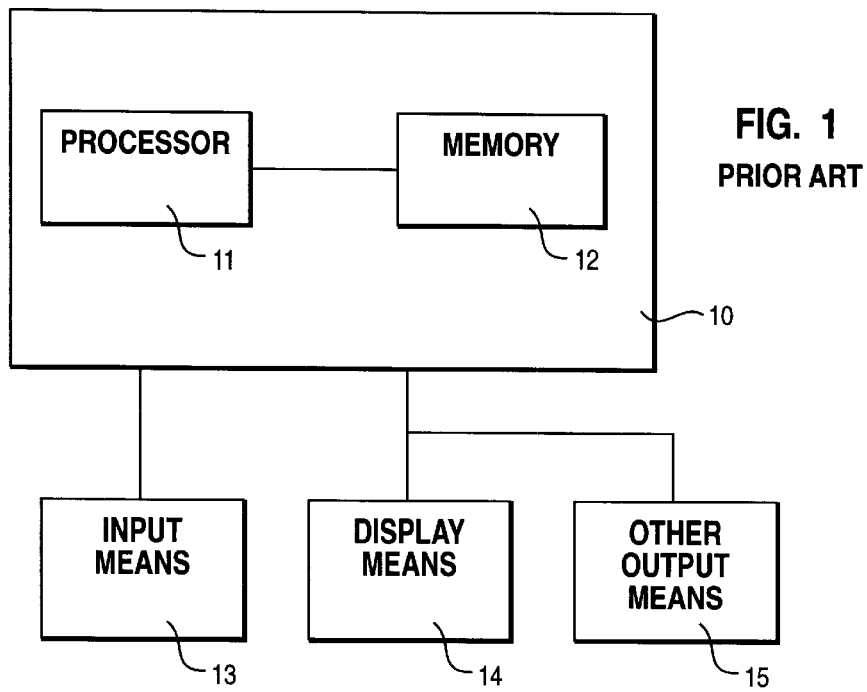
FIG. 1
PRIOR ART
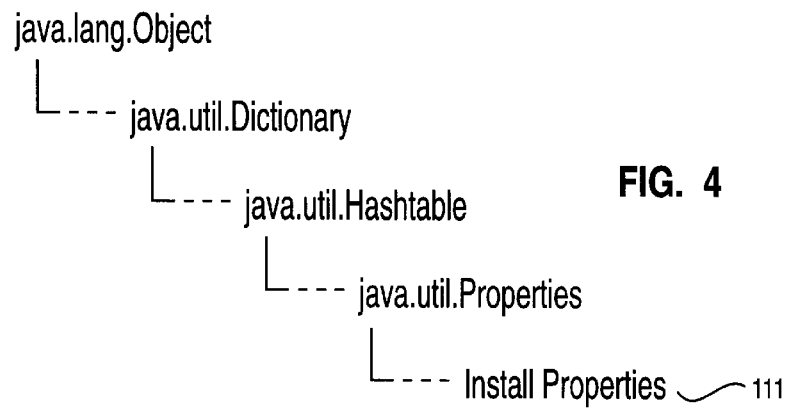
FIG. 3
```
                    Install Properties
            21               22
                 (key,value)      20
            23    ip.put (key,value)
                  ip.put ("Dest Dir", "c:\My Prod")
            24    ip.get ("Dest Dir")
```
```
java.lang.Object
    └---- java.util.Dictionary
            └---- java.util.Hashtable
                    └---- java.util.Properties
                            └---- Install Properties ___111
```
FIG. 4

CROSS PLATFORM INSTALLER-WITH THE ABILITY TO CREATE PLATFORM INDEPENDENT VARIABLES OF SPECIFIC OPERATING SYSTEM VARIABLES FROM A SCRIPTING LANGUAGE

CROSS-REFERENCE TO RELATED APPLICATIONS

The present application is related to the following applications:

Application Ser. No. 09/280,345 (IBM internal docket no. AT9-98-869), entitled "A CROSS-PLATFORM PROGRAM, SYSTEM, AND METHOD HAVING A GLOBAL REGISTRY OBJECT FOR MAPPING REGISTRY EQUIVALENT FUNCTIONS IN AN AIX OPERATING SYSTEM ENVIRONMENT";

Application Ser. No. 09/280,350 (IBM internal docket no. AT9-98-852), entitled "A CROSS-PLATFORM PROGRAM, SYSTEM, AND METHOD HAVING A GLOBAL REGISTRY OBJECT FOR MAPPING REGISTRY EQUIVALENT FUNCTIONS IN AN OS/2 OPERATING SYSTEM ENVIRONMENT";

Application Ser. No. 09/280,345 (IBM internal docket no. AT9-98-851), entitled "A CROSS-PLATFORM PROGRAM, SYSTEM, AND METHOD HAVING A GLOBAL REGISTRY OBJECT FOR MAPPING REGISTRY FUNCTIONS IN A WINDOWS OPERATING SYSTEM ENVIRONMENT";

Application Ser. No. 09/280,371 (IBM internal docket no. AT9-98-853), entitled "GLOBAL REGISTRY OBJECT FOR MAPPING REGISTRY FUNCTIONS AND REGISTRY EQUIVALENT FUNCTIONS ACROSS MULTIPLE OPERATING SYSTEMS IN A CROSS-PLATFORM PROGRAM";

Application Ser. No. 09/280,368 (IBM internal docket no. AT9-98-861), entitled "A CROSS-PLATFORM PROGRAM, SYSTEM, AND METHOD HAVING A SYSTEM INDEPENDENT REGISTRY FOR USE ON OPERATING SYSTEMS IRRESPECTIVE OF A REGISTRY EQUIVALENT";

Application Ser. No. 09/280,346 (IBM internal docket no. AT9-98-865), entitled "A SYSTEM, METHOD, AND PROGRAM FOR OVERRIDING PROGRAM PROPERTIES";

Application Ser. No. 09/280,352 (IBM internal docket no. AT9-98-863), entitled "A SYSTEM, METHOD, AND PROGRAM FOR PROVIDING AN OBJECT-ORIENTED INSTALL ARCHITECTURE";

Application Ser. No. 09/280,375 (IBM internal docket no. AT9-98-858), entitled "A SYSTEM, METHOD, AND PROGRAM FOR AUTOMATIC ERROR DETECTION WHILE UTILIZING A SOFTWARE STATE MACHINE FOR CARRYING OUT THE PROCESS FLOW OF A SOFTWARE PROGRAM";

Application Ser. No. 09/280,376 (IBM internal docket no. AT9-98-855), entitled "A SYSTEM, METHOD, AND PROGRAM FOR UTILIZING A SOFTWARE STATE MACHINE FOR CARRYING OUT THE PROCESS FLOW OF A SOFTWARE PROGRAM";

Application Ser. No. 09/280,369 (IBM internal docket no. AT9-98-859), entitled "A SYSTEM, METHOD, AND PROGRAM FOR ENABLING A SOFTWARE PROGRAM TO AUTOMATICALLY SELECT A SYSTEM-DEPENDENT FUNCTION";

Application Ser. No. 09/280,372 (IBM internal docket no. AT9-98-857), entitled "A SYSTEM, METHOD, AND PROGRAM FOR MAPPING A GLOBAL OBJECT TO DESKTOP ELEMENTS OF DIFFERENT OPERATING SYSTEMS";

Application Ser. No. 09/280,370 (IBM internal docket no. AT9-98-856), entitled "A SYSTEM, METHOD, AND PROGRAM FOR PROCESSING DEPENDENCIES USING A DEPENDENCY OBJECT";

Application Ser. No. 09/280,348 (IBM internal docket no. AT9-98-854), entitled "A SYSTEM, METHOD, AND PROGRAM FOR MODIFYING A TEXT FILE";

Application Ser. No. 09/280,351 (IBM internal docket no. AT9-98-866), entitled "A SYSTEM, METHOD, AND PROGRAM FOR UPDATING REGISTRY OBJECTS WITH A CROSS-PLATFORM INSTALLATION PROGRAM";

Application Ser. No. 09/280,374 (IBM internal docket no. AT9-98-867), entitled "A SYSTEM, METHOD, AND PROGRAM FOR PRESERVING BACKGROUND SETTINGS DURING INSTALL AND UNINSTALL OPERATIONS";

Application Ser. No. 09/280,347 (IBM internal docket no. AT9-98-860), entitled "A SYSTEM, METHOD, AND PROGRAM FOR MODIFYING A LIBRARY OBJECT";

Application Ser. No. 09/280,353 (IBM internal docket no. AT9-98-864), entitled "A SYSTEM, METHOD, AND PROGRAM FOR INSTALLATION ON DRIVES USING A DRIVE OBJECT"; and Application Ser. No. 09/280,373 (IBM internal docket no. AT9-98-868), entitled "A SYSTEM, METHOD, AND PROGRAM FOR PERFORMING PROGRAM SPECIFIC OPERATIONS DURING THE UNINSTALLATION OF A COMPUTER PROGRAM FROM A COMPUTER SYSTEM."

The above are all filed on the same day as the present application, assigned to the assignee of the present application, and incorporated by reference herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to cross platform programs, and more specifically to objects used within such programs that contain variables that become defined for a specific operating system environment.

2. Background and Related Art

An installer program is a software program that enables a programmer to write specific code that will allow a user to install a given application program onto the drives of a computer in a way that enables the given application program to work correctly with the computer's environment including its operating system. There are several types of installers—Java installers and operating system specific installers, e.g., Windows installers, OS/2 installers and AIX installers, etc. Many of these install programs existing today have various limitations in their functionality as discussed below.

One type of Java installer is provided by a software company known as InstallShield. Currently, this Java installer has some limitations on certain functional features. For example, the Java installer provides default panels, but the text can't be changed or configured. Also, this Java installer is not easy to customize. In other words, a programmer cannot easily add a function to the installer program that it doesn't already do. In addition, the Java installer does not provide very much registry support. A registry is a central repository for all possible information for the computer such as hardware configurations and software settings, etc. The registry enables a user/programmer to keep information about the software product. It enables a user to find out information about other products, based upon what the user/programmer put into the registry or what the user is looking for. Presently, the Java installer only works with a Windows' registry; and the support provided here is limited. For example, it does not enable the system Windows' registry to be updated directly. Instead, the keys to be updated are in a file which must be imported into the registry through a system call. It would be desirable if such a Java installer program supported multiple directories, splash screens (which are images that come up while a software product is being installed), and multiple languages instead of just English. Furthermore, it would be desirable for a given installer program to be more broadly applicable to other environments and operating systems. Although InstallShields' Java installer is tailored to Java, it is also geared somewhat for the Windows' operating system as discussed above in terms of the Windows' registry support provided. However, it does not provide specific support for other operating systems such as OS/2 or AIX.

Another Java installer is called "Install Anywhere" from ZeroG. This Java installer program also has a default panel that cannot be changed, i.e., it is not customizable in terms of the order in which the panels are to appear. Likewise, registry support is limited. A user/programmer updates a registry from a file using a "reg_edit" command. Although this installer program enables a user/programmer to add a few items into the registry, the registry cannot be queried. In addition, other registry functional features are not available. Likewise, there is no multiple directory support, and no national language support. Also, it does not support multiple operating systems, i.e., there is no OS/2 or AIX specific support.

Another approach would be to provide install APIs for Java. However, this approach is not yet available.

With respect to operating system specific installers, InstallShield provides a Windows' 32 installer. Although this installer program is widely used throughout the industry, it is based upon a proprietary scripting language that InstallShield defined. The scripting language is similar to Basic programming language. Nevertheless, a user/programmer must learn the scripting language to be able to write an install program, and it is not a real easy language to write in. When creating install programs using the Windows' 32 installer, a programmer must first learn the new language. Even then, it is difficult to write complicated install scripts with this scripting language.

For the OS/2 operating system, there is not a true architected way within the operating system itself to install. Two programs have existed for writing install code on OS/2. One of them is "Feature Installer", which has a tendency to be difficult to use. Also, it is hard to figure out how to write an install program from it. For example, it is tied into the workplace shell which requires special knowledge of SOM programming. Also, there is no compression of files. The second program is "Software Installer", which was the precursor to "Feature Installer", and is no longer supported as a product.

Also, for the OS/2 operating system, since OS/2 has Java on it, a programmer could use InstallShield's Java edition to write install code to install some types of programs. However, this does not provide much function other than just copying files.

Other than using Feature Installer, Software Installer, or a Java Installer, programmers must come up with their own way to write install code for an application program on an OS/2 machine.

Since the OS/2 operating system appears to have been architected without regard to install features, the above discussed ways for installing OS/2 application programs have no way to talk to each other. They will each have a different way of keeping track of things. As such, there is no one place to go to find out what has been installed on an OS/2 machine or to check dependencies to see what has been installed already.

For the AIX operating system, the command "installp" is used to install products. It is platform specific. It is also command line driven which is typical for the AIX operating system. Nevertheless, it appears to work well and is widely used.

As shown above, installers are tailored for a specific operating environment, e.g., JAVA, and/or operating system. As such, programmers using an installer to write install code must know and understand the specific operating environment and/or system quite well. This creates an added burden for a software company that produces many different application programs, with each application program available on many different operating systems. Separate install code must be written for each application for each different operating system. This requires a matrix of expertise—expertise in a given application, and expertise in a given operating system environment. This requires either a widely knowledgeable expert who is burdened with writing various specific versions of install code, or many different expert programmers who are essentially assigned the same task of writing install code.

Without such expertise, small software products just do not get install programs written for them for various platforms. Furthermore, money, resources, and time could be saved by writing an installer program only once that is applicable across all operating systems and environments.

It would also be desirable for a software manufacturer to have a common look and feel for writing install code for all of its products. In this way, as a programmer moved from platform to platform in writing install code, the programmer would recognize the interface, and know how it works. Thereby making the programmers task much easier.

Also, as shown above, there presently does not exist a functionally rich installer for Java. It is desirable to have a Java installer that is at least as functionally rich as a Window's installer.

SUMMARY OF THE INVENTION

It is therefore an object of this invention to provide a cross-platform installer that can be used to install products across multiple operating systems.

It is a further object of this invention to provide a tool kit that will enable a programmer knowledgeable in writing install programs to be able to automatically write an install program that is applicable across other operating systems and environments without having to be an expert in each of the operating systems and environments.

It is a further object of this invention to provide a common look and feel for writing install code for all products.

It is a further object of this invention to provide a full function installer.

It is a further object of this invention to enhance a program's applicability across multiple operating systems by providing system independent variables for system dependent values for properties used by the program.

The installer tool kit of the preferred embodiment of this invention supports the Windows 32 operating systems including Windows 95, Windows 98 and NT 4.0. It also supports OS/2 Warp 4.0, OS390, AIX 4.1 and higher versions, Solaris and Linux 4.2. Although the structure of the preferred embodiment enables support for any given operating system or environment, future embodiments or further enhancements to the present preferred embodiment will enable full support for other operating systems such as NT 5.0, HP-UX, and AS/400.

In the preferred embodiment of this invention, the functions provided by the installer tool kit are script based (Java). This enables the developer who is writing an installer to do whatever the developer wants to do. The developer is not limited in having panels occur in a particular order, or in not being able to make the calls that need to be made, or in not being able to perform a desired function such as configuring files, etc. To accomplish this, the tool kit was written using Java, although any script-based language would provide this same flexibility. As such, anything that Java has available in it is available to the developer. Furthermore, the tool kit enables a developer to perform functions on files and directories, e.g., to copy, read, create, modify, version and to batch files. With respect to registry functions, the tool kit enables a developer to write an install program that can read, create, modify, delete, and enumerate registries for the Windows operating system which is the only operating system that has a registry. These same functions are provided for all other operating systems that do not have a registry, but do have registry equivalent functionality.

Other functions of the tool kit include i) providing install property objects that contain variables as values that become defined for a specific operating environment; ii) enabling a property value to be temporarily overridden; iii) a software state machine that enables a programmer to easily customize an install program by merely adding, deleting, or changing the various states that contain the functions and flow of control of the program; iv) automatically detecting a programming error if a programmer incorrectly specifies a nonexistent state within the state machine; v) automatically selecting a system-dependent function; vi) a containment structure consisting of program object/fileset objects/install objects where each fileset object and install object contains means to install and uninstall itself and to log itself; vii) enabling the management of folders, shortcuts and icons, viii) enabling environment variables to be read, created, modified and deleted, ix) providing dependency checking of prerequisite programs during both install and uninstall, and x) providing various logs, e.g., a log for keeping track of what is being installed, and a log that reports the progress of install. Logs are used for both the install and uninstall process. Furthermore, these logs are human readable which allows them to be checked, e.g., after a silent install, to ensure that a file has installed successfully. The tool kit also enables multiple destination directories to be installed from multiple source directories. For example, there can be multiple components of file sets included in an install where a file set is a separately installable/uninstallable piece of code or set of files.

The tool kit also enables an install program to undo an install. What has been changed during an install is kept track of. If the install is over the top of a previous install, the changes are saved in a file and restored if the latest install is then uninstalled. In other words, a previous version is recovered when a latest version is uninstalled by replacing a backup of files.

Other features include a) a progress bar that shows the status during an install, b) splash screens which can be displayed during an install, c) national language support, d) the ability to perform unattended install from install scripts, and e) an install wizard. There are also twenty or so defining default panels that are available. It is also easy for a programmer to add a programmer's own panels without a lot of effort.

More specifically, a system, method, and program enables a platform independent way for specifying a property, or function, of a program Values of properties that are specific to a given operating system are treated as a variable in a program which enables it to run on multiple operating systems. This enables the program to be developed and run on different operating systems. A script file, easily editable by a programmer developing a program and stored in nonvolatile memory, contains a list of all of the applicable properties and associated values for each of the properties used by the program. If a value for a property is dependent upon a specific operating system, a variable, having a predefined nomenclature is used in the script file as the associated initial value for that property. The program reads in the properties and the values, or variables, from the script file into property objects. As such, variables that have meaning to a system can be put into the property object as the value for that property. To use the property by the program, the program sends a get call to the property object to get the value or to provide substitution of a platform specific value for the variable. Accessible to the program is a plurality of operating system specific code segments which define an actual value for the variable for the specific operating systems. Once the substitution is made, the program uses the actual substituted value for the process the program is carrying out. At the end of the program's process, the program saves the properties by parsing out the operating system specific value and inserting the variable back in. The program is then capable of being run on a different operating system. For example, in developing an install program that is capable of installing a same program for multiple operating systems, the variable {root} is used as the value for the "directory" property. The actual value (c:/, or/user/, etc.), depending upon the given operating system, is substituted for the variable {root}. This provides a platform independent way for an install program to specify and use directories or other install properties or for other programs to specify and use properties in general; i.e., by creating platform independent values for properties.

Preferred embodiments of the invention include a) an installer tool kit, including a system, method and program, that enables the creation of install programs for any one of a plurality of operating systems as described herein, b) an install program that can be used for multiple platforms to install an application program on a specific operating system; i.e., the same install program can be used to install a similar application program on different operating systems, c) a method for carrying out the functions of the install program, and d) a computer system running the install program on a specific operating system for installing an application program. Other more general embodiments include a) any tool kit for enabling the creation of programs that are capable of running on more than one operating system, b) any program that is enabled for multiple platforms, c) methods carried out by cross platform programs, and d) a computer system running a program that is enabled for multiple platforms.

BRIEF DESCRIPTION OF THE DRAWINGS

FIG. 1 depicts a block diagram of a data processing system in which a preferred embodiment of the present invention may be implemented;

FIG. 3 illustrates the use of variables in a properties object; and

FIG. 4 illustrates the class hierarchy of the InstallProperties object.

DETAILED DESCRIPTION

Figure 2:
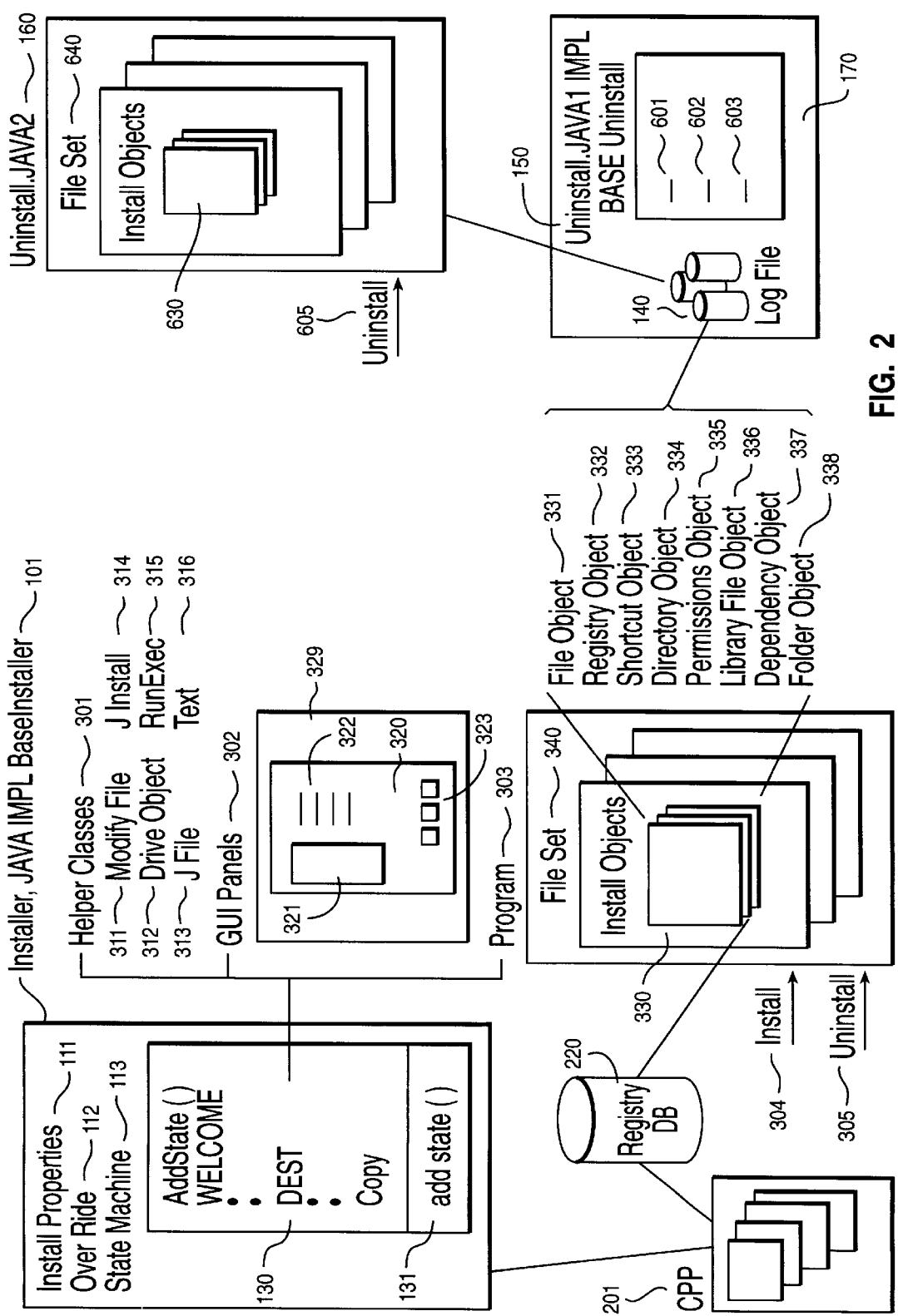
FIG. 2 depicts the flow and structural components of a cross-platform installer program.

The following description and the accompanying drawings illustrate a preferred embodiment of the present invention. It is understood that other embodiments may be utilized, and structural and operational changes may be made, without departing from the scope and spirit of the present invention.

With reference to FIG. 1, a block diagram of a data processing system 10, i.e., computer system, in which a preferred embodiment of the present invention may be implemented is depicted. The computer includes a processor 11 and memory 12. The computer 10 may be, but is not limited to, a personal computer, workstation, or a mainframe. The computer system also includes input means 13 such as a keyboard and/or mouse and/or track ball and/or light pen and/or pen-stylus and/or voice-sensitive device and/or touch-sensitive device, and/or other pointing devices and/or other input means. Also included are display means 14 such as a display monitor and other output means 15 such as printers, etc. Memory 12 includes volatile or nonvolatile storage and/or any combination thereof. Volatile memory may be any suitable volatile memory device known in the art, e.g., RAM, DRAM, SRAM, etc. Nonvolatile memory may include storage space, e.g., via the use of hard disk drives, for programs, whether or not the programs are being executed. The programs in memory 12 include an operating system program and application programs, such as an install program or an installer tool kit. If the memory 12 is comprised of volatile and nonvolatile memory devices, then data and programs may be swapped between the volatile and nonvolatile devices in a manner known in the art.

The exemplary embodiment shown in FIG. 1 is provided solely for the purposes of explaining the invention and those skilled in the art will recognize that numerous variations are possible, both in form and function. For instance, any one or more of the following—the processor and/or memory and/or the input/output devices—could be resident on separate systems such as in a network environment. Any such variation to FIG. 1 is within the sprit and scope of the present invention. The computer system and parts thereof depicted in the figures and described below, and the Java implementations described herein, are provided solely as examples for the purposes of explanation are not intended to necessarily imply architectural limitations. Those skilled in the art will recognize the numerous programming languages which may be utilized, all of which are believed to be embraced within the spirit and scope of the invention.

The system, method and program of a preferred embodiment of this invention enables the creation of a cross-platform installer program in accordance with the structural components and flow of FIG. 2.

A script, referred to herein as "installer.java", 101 FIG. 2, is used to run the install engine. The script implements the base installer class in Java. Within the script 101 there are the following entities: a) install properties 111; b) an override function 112; and c) a state machine 113. Within the state machine 113, there are various states 130 such as a welcome state, a destination state, a copy state, etc. This state machine includes an "add state method" 131 which is further used to check for errors. The following process takes place when the base installer class starts running: a) the properties are set up, 111, b) the properties are overridden, 112, and then c) the state machine 113 is executed. The program stays in the state machine until exited out. At exit, the program has either been successfully or unsuccessfully installed.

Within any given state 130 there are several objects. There are helper classes 301, GUI panels 302, and a program object 303.

Within the helper classes 301, there is a modify file class 311, a drive object class 312, a J file class 313, a J install class 314, a run exec class 315, and a text class 316. The modify file class 311 and drive object 312 will be discussed in more detail either further below or in a related application. J file 313 is a class that enables actions to be performed with files and directories. J install 314 contains methods that enables access to environment variables and enables other similar activities. Run exec 315 is a class that enables the running of operating system calls. Text class 316 is a class that is used to handle national language support.

An example of a GUI panel 320 is shown in FIG. 2. There may be an image 321, text or controls 322 and buttons 323 such as back, next or cancel. The GUI panels 320 all extend a class calling a wizard dialog. They are displayed in a mainframe class 329. The mainframe class manages the screen display, e.g., gradient background color, gradient text. It also manages the splash screens and titles and other similar items including where they are being displayed. In other words, it manages the background image and screen image upon which the dialogs are displayed.

Within any given state there is also the heart of the install program, which is a program object 303 having file set objects 340. Within each file set object 340 there are multiple install objects 330. There are several types of install objects—file object 331, registry object 332, shortcut object 333, directory object 334, permissions object 335, a library file object 336, a dependency object 337, and folder object 338. Other objects are also possible. All of these objects extend or implement install objects 330. In addition, all of the install objects have certain methods on each of them. In particular, each install object knows how to install or uninstall itself, how to log itself, and how to internalize from a log, i.e., how to build itself back up again from reading from a log.

The install process that the script 101 enables includes running the state machine 113 through various states 130 which cause different events to take place. For example, a GUI panel may pop up as part of the welcome state. During a destination state, another GUI panel may pop up on the screen that asks where the product is to be installed. The install properties 111 may be used in the destination state by having a destination panel set a particular destination directory name of an install property to a particular directory. During the copy state, the program object 303 is built up with all of the install objects 330 in them. The install command 304 is then called on the program object. Each one of the file sets 340 and install objects 330 contains an install method. As such, by calling install 304 on the parent object, i.e., the program object 303, the program object goes through and calls install on all of the other objects 340, 330 that it contains.

Likewise, the uninstall process is also enabled by the script 160. For uninstall, there is an uninstall method on the file set 340 and on all of the other install objects 330. By calling uninstall 305 on the program 303, everything becomes uninstalled, i.e., the program, file sets and install objects.

It should be noted that during an install, each one of the install objects 330 gets written out to a log file 140 which is put into a particular directory. At the same time that the install objects 330 log themselves to the log file, there is also another file, called "uninstall.Java1" 150 which implements a "base uninstall" class. It has several methods in it that get called at different points during uninstall. During install, the log 140 and "uninstall.Java1" 150 information are built. The log file 140 and "uninstall.Java1" 150 are in the file system 170 on a particular directory. If it is uninstalled, the first thing that happens is that it reads into "uninstall.Java2" 160 the log files 140 and recreates the same structure 160 as the file sets 340 and install objects 330. It does not recreate the program object 303, but rather it recreates the structure of everything contained within the program object, i.e., file sets 640 and install objects 630. As a result, recreated from the log file 140 is a file set with all of the install objects that it contains. There is one log file for each file set. Directory 170 can be thought of as a container just like the program directory 303 is a container for the file set 340 and install objects 330.

"Uninstall.java2" 160 builds up the file sets 640. Uninstall 605 is called by the uninstaller, and it goes through each file set and install object and uninstalls itself. During the uninstall of each file set 640, the base uninstaller class 150 is called at the beginning and at the end of the file set. Therefore, at the beginning and ending of copying a file set 640, the installer makes a call to the base uninstaller class 150 at appropriate points 601, 602, 603, as discussed below. This allows certain things to happen when the file set is being uninstalled.

There are certain platform specific operations that are taking place throughout the different objects, i.e., the helper classes 301, install objects 330, etc. Therefore, there is a platform specific module/interface. It is referred to herein as CPP 201. It defines a set of methods, that are representative of different operating systems, for functions that need to take place for an install. There are several different CPPs 211, 212, 213, . . . 219, etc., one for each operating system. For example, CPP Win 32, CPP OS/2, CPP Solaris, CPP Linux, and CPP AIX. There is also a CPP default. If the operating system is not implemented through a CPP, the CPP default is used. This CPP 201 is the platform specific code for the installer.

Since most platforms, i.e., operating systems, do not have a registry, a platform independent registry database class 220 is created which ties the platform specific code 201 with registry objects 332. The registry database 220 implements the registry function for those platforms which do not have a registry.

The above description presented an overview of the install program and how it works. The following describes, in more detail, specific parts of the overall structure and process described above.

More specifically, the preferred embodiment of this invention enables a program to be platform independent by utilizing a properties object with variables. An install properties object ("InstallProperties") with variables is used in an install program. The variables are delimited by braces, {var}. The install program of the preferred embodiment currently utilizes the following variables: {root}, {programDir}, {/}, and {\}. Environment variables can be used, also, e.g., {env_variable}. Other variables for install programs or other types of programs are also within the scope of this invention. The expanded variables are converted back to the original name during a put( ).

The install properties 111, FIG. 2 is implemented as a Java public class. FIG. 4 shows the class object hierarchy to which the install properties 111 belong. The InstallProperties class extends the Properties class 1 10. This class is used to provide the translation of variables in the value of the property. The many different properties function as variables in the Java script program 101. These properties, or variables, will be set by a programmer at one point in the programmer's install program, and then used at another point in the program. Although one implementation approach would be to create the variable and keep track of the property as a variable, another implementation of the preferred embodiment utilizes the provisions for properties in Java as hash tables. The hash tables keep track of a key 21 and a value 22 as shown in FIG. 3:

(key, value)

A put method 23 is used which puts a destination directory called c:\myprod into the property object having the structure (key,value) through the following call:

ip.put ("DestDir", c:\myprod)

"DestDir" is the key 21, and "c:\myprod" is the value 22. Further down within the program, a get method 34 ip.get("DestDir)

can be called for the destination directory key which will get whatever value was put into the property object for the destination directory.

As shown, the install properties 111 function as if they were variables. An important aspect of the preferred embodiment is that not only can text be put into the property object as the "value" 22, but variables that have meaning to the system can be put into the property object as its value 22, also. Variables are designated by the left and right braces { }. For example, there may be a variable {root}.

{root} MyProd

The variable "root" goes to the platform specific code 201, FIG. 1, and asks "what is the root of the file system for this operating system?" For the Windows operating system, it might be "C:/"; for the AIX operating system, it might be "/user". As a result, a call 23, to the put method, consisting of ip.put ("DestDir", {root} myprod) will go and get the specific information from the operating system or operating system specific code. It will then substitute the operating system's root directory, e.g., "c:/" or "/user/", etc. into the variable "{root}" of the value 32 of a property object used in a put method. For example, ip.put("DestDir", c:/myprod)

This produces a platform independent way of specifying directories. This same process and structure can be used to create platform independent values for other install properties.

More specifically, the put method and get method are described as follows:

put public void put (string key, string value)

This method saves the key and value of a property. This method looks at the value being set and checks to see if it starts with the {root} variable. If it does, then it is substituted and saved to the key. This enables a destination directory to be saved, and the {root} part of the directory to be extracted so that it will work on other operating systems.

get public String get (string name)

This method gets the value of a property. This method looks for embedded variables in the value and converts them. Variables are defined by using left and right braces, such as "{variable}". The variable can be {root} which is the root directory, or any environment variable, such as {path} or {classpath }.

Parameters:
 name—the name of the property to get
Returns:
 the value of the property The code that queries the system for the root directory, or other value for a variable, is part of the CPP 201 module. The CPP 201 module contains a variety of calls such as ".get ({root})", .get({programDir}), .get({win.dir}), etc., where "{root}" and "{programDir}", etc., are variables.

.get({root}MyProd)
 {programDir}
 {win.dir}

A variable or "place holder" is being inserted into the call in order to tell the system to go out and get the platform specific information. Environment variables can also be inserted. For example, "windir" is an environment variable in the Windows operating system. To find out where it is, "windir" is inserted as the "value" in a get call. The system will substitute back the location, e.g., C:\Windows or C:\innt, etc.

As such, the install properties object is unique in that a GET call provides substitution of a platform specific value for a variable. With the substitution, the put call becomes, for example, .put ("DestDir", "c:\myProd")

When the install properties are saved, the root directory "c:\", in this example, will then get parsed out. The variable "{root}" gets saved back into the destination directory, and is preserved. This is particularly useful for a programmer building an install program. The properties can be saved in a way that helps to automate the install process. For example, if a programmer is writing an install program for a product for the Windows operating system, but the product is also to be installed on the AIX operating system , the same install program can be used. However, for the install program to work on the AIX operating system, the programmer does not want "c\:" in the list of properties when the destination directory property is saved back.

A file, e.g., "install.script", stored on a hard disk contains a list of properties, along with a list of variables, e.g., "DestDir={root}MyProd". In installer.java 101, the properties are read from the "install.script" file into an install properties object. All of the variables are then available to the install properties object. After this, GET calls and PUT calls are used to read out and save those properties. At the end of the install.script file, the properties can be saved by saving the install properties object. The file writes the properties back out with the new settings on the properties.

The install properties are unique in that they are the options that define what it is that the script 101 is to do. The install properties are read in and set up at 111. During the state machine 113 phase, the properties are either being used or they are being changed. For example, they are changed in the GUI panels, and then during the building of an install process, i.e., the program 303, they are used with the values that were set previously. In addition, at the end of the process, there is an option to save the properties as they were set throughout the program. As such there can be a blank list of properties that can be configured as to how it is to run automatically the next time. Once a product has been purchased and the install program has been written, a user can go back through the install program, without having its source code, and configure it to reflect the way the user wants the purchased program to be installed for any one of several different operating systems. Install Properties

---

```
---- install.script
    #Java Install script file
    #Tue Mar 10 15:44:41 CST 1998
    destinationDirectory = {programDir} JIDemo {/}
    questionsName =
    folder = Install Toolkit for Java Demo
    questionsCompany =
    infoString = Install to directory c:\\JInstall Demo\\\nName =
    \nCompany = \nName =
\nCompany = \nField3 = \nField4 = \nField5 = \nField6 =
\nField7 = \nField8 =
\Folder = Install Toolkit for Java Demo\n
    locale = en_US
---- from Installer.java
    /**
    * Properties that hold options selected by user or from auto-script.
    * You can only add Strings to this object.
    public InstallProperties installp = new InstallProperties();
    installp.put("programName", "New Install Program");
    installp.put("programVersion", "1.0");
    installp.put("componentName", "Base");
    installp.put("componentVersion", "1.0");
    installp.put("folder", "New Install");
    installp.put("destinationDirectory", "{root} NewInstall {/}");
    installp.put("logFileName", "Inst");
    installp.put("zipFileName", "data.zip");
    installp.put("infoString", "");
    installp.put("locale", "en_US");
    // Load an install script.
    File iFile = new File(scriptFile);
    if (iFile.exists() && scriptLoad) {
       try {
         FileInputStream inStream = new FileInputStream(scriptFile);
         installp.load(inStream);
         inStream.close();
       } catch (Exception e) {
       }
    }
    // If recording script, then save it
    if (scriptRecord) {
       try {
         FileOutputStream outStream =
         new FileOutputStream(scriptFile);
         installp.save(outStream, "Java Install script file");
         outStream.close();
       } catch (Exception e) {
       }
    }
```

(Copyright of the IBM Corporation, 1998)

---

The present invention has been describe above in the context of a fully functional system, method, and computer program; all of which are capable of being contained within one or more physical devices. The program of this invention is capable of being made, used, sold and distributed in the form of a computer usable medium of instructions in a variety of forms. The present invention applies equally regardless of the particular type of signal bearing media actually used. Examples of computer usable media include volatile memory (e.g., RAM, DRAM, SRAM); nonvolatile memory such as read only memories (ROMs ) or erasable, electrically programmable, read only memories (EPROMs), or recordable type media such as floppy disks, hard disks and CD-ROMs; and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A program on a computer usable medium comprising:
means for designating values of properties that vary in value for different operating systems as variables having a predefined nomenclature;
means for using the properties within the program by getting an actual separate value for each of the variables through operating system specific code accessible to the program.

2. A program on a computer usable medium comprising:
means, for enabling the program to be executed on a plurality of operating systems, comprising;
means for utilizing a separate predefined variable as a value for each one of a plurality of properties, used by the program and having the value dependent upon a specific operating system;
means for automatically setting the value for a given operating system by calling, from the program, a method to get the value from operating system specific code accessible to the program.

3. A program, on a computer usable medium, for performing a process, comprising:
a property object having a structure enabling substitution of a platform specific property value for a property variable within the property object;
means for getting an actual value for the property variable through a call to platform specific code; and
means for automating the process for a plurality of platforms by parsing out the actual value and saving the property variable back into the property object during a save of the property object after an execution of the process.

4. A program, on a computer usable medium, for performing a process, comprising:
means, for enabling the program to be executed on a plurality of operating systems, comprising;
  i) a property object having a structure (key, value) wherein "key" is a specific property type and "value" represents an associated value for that specific property type;
  ii) an operating system specific code segment for each one of the plurality of operating systems;
  iii) program code for reading, prior to performing the process, a stored list of specific property types with associated values, having at least one embedded variable within at least one of the values, into the property object;
wherein a corresponding value for the embedded variable is dependent upon a specific operating system;
  iv) means for setting at least one of the properties by getting the actual values of the embedded variable from the operating system specific code segment within the program;
  v) means for using the at least one set property and actual value during the process; and
  vi) means for saving the property, at the end of the process, by parsing out the actual value of the embedded variable and saving the property with the embedded variable.

5. A program, on a computer usable medium, for performing a process, comprising:
means, for enabling the program to be executed on a plurality of operating systems, comprising;
  i) a property object having a structure (key, value) wherein "key" is a specific property type and "value" represents an associated value for that specific property type;
  ii) an operating system specific code segment for each one of the plurality of operating systems;
  iii) program code for causing a reading, prior to performing the process, of a stored list of specific property types with associated values, having at least one embedded variable within at least one of the values, into the property object;
  iv) means for setting at least one of the properties by getting the actual values of the embedded variable from the operating system specific code segment within the program;
  v) means for using the at least one set property and actual value during the process; and
  vi) means for providing an option to a user of the program to save the property, at the end of the process, by either parsing out the actual value of the embedded variable and saving the property with the embedded variable, or by saving the property as set and used during the process.

6. An install program on a computer usable medium, comprising:
means for saving a destination directory as a property;
means for determining if the value of the property contains a root variable to enable the property to be applicable across different operating systems;
means for getting the actual value for a specific operating system from operating system specific code, for the specific operating system, the operating system specific code being accessible to the install program, if the value of the property contains the root variable; and
means for parsing out the actual value and substituting back in the root variable when the destination directory is saved at the end of the install program.

7. An installer tool kit on a computer usable medium comprising:
means for enabling a creation of an install program to run on any given one of a plurality of operating systems;
means for enabling the creation of the install program to have a capability to use properties and associated values for each property wherein each associated value is an actual value if the associated value is platform independent and wherein each associated value is a variable having a predetermined nomenclature if the associated value is platform dependent; and
means for enabling the creation of the install program to access one of a plurality of operating system specific code segments for the given one of the plurality of operating systems to substitute an actual value for the variable when using a property having the variable as the associated value.

8. The installer tool kit on the computer usable medium of claim 7 further comprising:
means for providing an option in creating the install program to allow the install program to save the properties by parsing each substituted actual value and inserting the variable or to save the property with the substituted value.

9. A method comprising:
treating, by a program on a computer usable medium, corresponding values of properties specific to a given operating system as an associated variable having a predefined nomenclature;

reading into each one of a plurality of property objects usable by the program from a script file stored on a computer readable medium a list of properties and an associated value if the associated value is platform independent, and the associated variable, if the corresponding value is platform dependent, having the predefined nomenclature for each property;

accessing, by the program, a specific one of a plurality of operating system specific code segments to substitute an actual value for any variable read into a property object for a property being used by the program;

saving, at the end of the program, the properties by parsing out each substituted actual value and inserting the variable.

10. A computer implemented method comprising:

utilizing a separate predefined variable as a value for each one of a plurality of properties, used by the program and having the value dependent upon a specific operating system; and automatically setting the value for a given operating system by calling, from the program, a first method to get the value from operating system specific code accessible to the program.

11. The method of claim 10 further comprising:

parsing out the actual value and saving the property variable back into the property object during a save of the property object after an execution of the process.

12. A computer implemented method comprising:

saving a destination directory as a property;

determining if the value of the property contains a root variable to enable the property to be applicable across different operating systems;

getting the actual value for a specific operating system from operating system specific code, for the specific operating system, the operating system specific code being accessible to the install program, if the value of the property contains the root variable; and parsing out the actual value and substituting back in the root variable when the destination directory is saved at the end of a process using the destination directory.

13. A computer system comprising:

property objects, stored in memory, each having a structure (key, value);

a script file, stored in memory, having a list of properties and associated values if the values are platform independent and associated variables having a predefined nomenclature as a placeholder for platform dependent values if the values are platform dependent;

means for reading the properties and actual values and variables from the script file into the property objects;

a plurality of operating system specific code segments, accessible to a program running on the computer system, having the platform dependent values for each variable;

means for using a property by a program running on the computer system by getting the value from the property object when the value is platform independent and by getting an actual value from a specific one of the plurality of operating system specific code segments when the actual value is platform dependent;

means for saving each property by parsing out any actual value, if the value is platform dependent and inserting the variable back into the each corresponding property object at the end of the program.

14. A computer system comprising:

means, for enabling a program to be executed on a plurality of operating systems, comprising;

means for utilizing a separate predefined variable as a value for each one of a plurality of properties, used by the program and having the value dependent upon a specific operating system;

means for automatically setting the value for a given operating system by calling, from the program, a first method to get the value from operating system specific code accessible to the program.

15. A computer system comprising:

a property object having a structure enabling substitution of a platform specific property value for a property variable within the property object;

means for getting an actual value for the property variable through a call to platform specific code; and means for automating the process for a plurality of platforms by parsing out the actual value and saving the property variable back into the property object during a save of the property object after an execution of the process.

16. A computer system comprising:

i) a property object having a structure (key, value) wherein "key" is a specific property type and "value" represents an associated value for that specific property type;

ii) an operating system specific code segment for each one of the plurality of operating systems;

iii) means for reading, prior to performing the process, a stored list of specific property types with associated values, having at least one embedded variable within at least one of the values, into the property object;

wherein a corresponding value for the embedded variable is dependent upon a specific operating system;

iv) means for setting at least one of the properties by getting the actual values of the embedded variable from the operating system specific code segment within the program;

v) means for using the at least one set property and actual value during the process; and vi) means for saving the property, at the end of the process, by parsing out the actual value of the embedded variable and saving the property with the embedded variable.

17. A computer system comprising:

i) a property object having a structure (key, value) wherein "key" is a specific property type and "value" represents an associated value for that specific property type;

ii) an operating system specific code segment for each one of the plurality of operating systems;

iii) means for reading, prior to performing the process, a stored list of specific property types with associated values, having at least one embedded variable within at least one of the values, into the property object;

iv) means for setting at least one of the properties by getting the actual values of the embedded variable from the operating system specific code segment within the program;

v) means for using the at least one set property and actual value during the process; and vi) means for providing an option to a user of the program to save the property, at the end of the process, by either parsing out the actual value of the embedded variable and saving the property with the embedded variable, or by saving the property as set and used during the process.

18. A computer system comprising:

means for saving a destination directory as a property;

means for determining if the value of the property contains a root variable to enable the property to be applicable across different operating systems;

means for getting the actual value for a specific operating system from operating system specific code, for the specific operating system, the operating system specific code being accessible to the install program, if the value of the property contains the root variable; and means for parsing out the actual value and substituting back in the root variable when the destination directory is saved at the end of the install program.

19. A computer system comprising:

means for enabling a creation of an install program to run on any given one of a plurality of operating systems;

means for enabling the creation of the install program to have a capability to use properties and associated values for each property wherein each associated value is an actual value if the associated value is platform independent and wherein each associated value is a variable having a predetermined nomenclature if the associated value is platform dependent; and means for enabling the creation of the install program to access one of a plurality of operating system specific code segments for the given one of the plurality of operating systems to substitute an actual value for the variable when using a property having the variable as the associated value.

20. The computer system of claim 19 further comprising:

means for providing an option in creating the install program to allow the install program to save the properties by parsing each substituted actual value and inserting the variable or to save the property with the substituted value.

\* \* \* \* \*